(12) United States Patent
Al-Ahmad et al.

(10) Patent No.: US 8,377,860 B2
(45) Date of Patent: Feb. 19, 2013

(54) POLYMERS WITH PENDANT HETEROCYCLIC-CONTAINING GROUPS AND LUBRICATING OIL COMPOSITIONS CONTAINING SAME

(75) Inventors: Saleem Al-Ahmad, Jeddah (SA); Marina Baum, Chagrin Falls, OH (US); Jonathan S. Vilardo, Chardon, OH (US); Patrick E. Mosier, Bay Village, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 356 days.

(21) Appl. No.: 12/670,003

(22) PCT Filed: Aug. 18, 2008

(86) PCT No.: PCT/US2008/073434
§ 371 (c)(1),
(2), (4) Date: May 11, 2010

(87) PCT Pub. No.: WO2009/026201
PCT Pub. Date: Feb. 26, 2009

(65) Prior Publication Data
US 2010/0286003 A1 Nov. 11, 2010

Related U.S. Application Data

(60) Provisional application No. 60/956,790, filed on Aug. 20, 2007.

(51) Int. Cl.
*C10M 151/02* (2006.01)
*C10M 137/06* (2006.01)

(52) U.S. Cl. ......... 508/507; 508/509; 508/185; 508/371
(58) Field of Classification Search .................. 508/185, 508/507, 509, 371
See application file for complete search history.

(56) References Cited

U.S. PATENT DOCUMENTS

| | | | |
|---|---|---|---|
| 4,013,571 A | | 3/1977 | Williams et al. |
| 4,019,991 A | | 4/1977 | Jayne et al. |
| 4,224,170 A | * | 9/1980 | Haugen .................... 508/399 |
| 5,019,283 A | | 5/1991 | Beltzer et al. |
| 5,672,727 A | * | 9/1997 | Chiu .......................... 558/236 |
| 5,958,850 A | * | 9/1999 | Matsuzaki et al. ......... 508/435 |
| 6,746,057 B2 | * | 6/2004 | Goto et al. ................. 285/333 |
| 6,759,484 B1 | * | 7/2004 | Murayama et al. ......... 525/385 |
| 2003/0065056 A1 | | 4/2003 | Hotta et al. |

FOREIGN PATENT DOCUMENTS

EP 1506964 A1 2/2005

OTHER PUBLICATIONS

J. Org. Chem., 1996, 60 473-475, Kihara et al., Nov. 2, 1995.
Corresponding PCT Publication No. WO 2009/026201 A1 and PCT Search Report published Feb. 26, 2009.
Written Opinion from corresponding PCT Application No. PCT/US2008/073434 completed Jan. 14, 2009.

* cited by examiner

*Primary Examiner* — Jim Goloboy
(74) *Attorney, Agent, or Firm* — David M. Shold; Christopher D. Hilker

(57) ABSTRACT

The disclosed invention relates to polymers with heterocyclic-containing groups, and to concentrates and lubricating oil compositions containing the polymers.

20 Claims, No Drawings

POLYMERS WITH PENDANT HETEROCYCLIC-CONTAINING GROUPS AND LUBRICATING OIL COMPOSITIONS CONTAINING SAME

TECHNICAL FIELD

This invention relates to polymers with pendant heterocyclic-containing groups, and to concentrates and lubricating oil compositions containing these polymers.

BACKGROUND OF THE INVENTION

For decades zinc dialkyldithiophosphates (ZDDPs) have been used as extreme pressure (EP) and antiwear additives in engine oils. A problem with the use of these compounds, however, is that phosphorus contaminates catalysts used in exhaust gas after treatment devices and thereby reduces their effectiveness. In response to this problem, the phosphorus concentration has been reduced for some Society of Automotive Engineers (SAE) passenger car engine oil classifications. With the introduction of ILSAC GF-1, phosphorus levels were limited to no more than 1200 parts per million (ppm) and with GF-3 to 1000 ppm. Even at these levels of phosphorus, however, catalyst contamination is still an issue. The problem therefore is to provide adequate engine lubrication and at the same time reduce catalyst contamination. The disclosed invention, in at least one embodiment, provides a solution to this problem.

SUMMARY OF THE INVENTION

This invention relates to a polymer comprising units represented by the formula

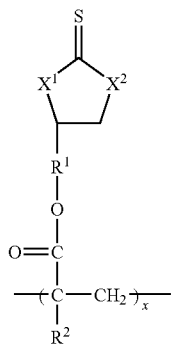

(Ia)

and units represented by the formula

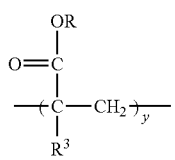

(II)

wherein: R, $R^1$, $R^2$ and $R^3$ are independently hydrocarbyl groups and $R^2$ and $R^3$ may also independently be hydrogen; one of $X^1$ and $X^2$ is S and the other of $X^1$ and $X^2$ is O; x is the number units represented by formula (I) in the polymer; y is the number of units represented by formula (II) in the polymer; the ratio of y to x being in the range from about 0.1 to about 20; the polymer having a weight average molecular weight in the range from about 5,000 to about 1,000,000, and a polydispersity in the range from about 1 to about 15.

The invention also relates to concentrates and lubricating oil compositions comprising the foregoing polymer. The inventive polymer may be used as a partial or complete replacement for ZDDP in lubricating oil compositions and thereby provide such lubricating oil compositions with desired EP and/or antiwear properties while at the same time allowing for reduction or elimination of phosphorus contamination.

DETAILED DESCRIPTION

The term "hydrocarbyl," when referring to groups attached to the remainder of a molecule, may refer to groups having a purely hydrocarbon or predominantly hydrocarbon character within the context of this invention. These groups may include the following:

(1) Purely hydrocarbon groups; that is, aliphatic, alicyclic, aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). These may include alkyl groups, alkylene groups, and the like. Examples may include methyl, methylene, octyl, cyclohexyl, phenyl, etc.

(2) Substituted hydrocarbon groups; that is, groups containing non-hydrocarbon substituents which do not alter the predominantly hydrocarbon character of the group. Examples include hydroxy, nitro, cyano, alkoxy, acyl, etc.

(3) Hetero groups; that is, groups which, while predominantly hydrocarbon in character, contain atoms other than carbon in a chain or ring otherwise composed of carbon atoms. Examples include nitrogen, oxygen and sulfur.

In general, no more than about three substituents or hetero atoms, and in one embodiment no more than one, may be present for each 10 carbon atoms in the hydrocarbyl group.

The term "hydrocarbyl" will also encompass polyvalent groups of the type described above, which may be written as —R—. Such groups may also be referred to as "hydrocarbylene" groups.

The term "lower" as used herein in conjunction with terms such as hydrocarbyl, alkyl, alkenyl, and the like, may describe such groups which contain a total of up to 7 carbon atoms.

The term "oil-soluble" may refer to a material that is soluble in mineral oil to the extent of at least about 0.5 gram per liter at 25° C.

The term "TBN" may refer to total base number. This is the amount of acid (perchloric or hydrochloric) needed to neutralize all or part of a material's basicity, expressed as milligrams of KOH per gram of sample.

The inventive polymer, which may be in the form of a random copolymer, a block copolymer or a star polymer, may comprise units represented by the formula

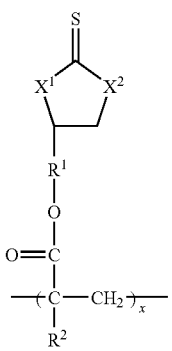

(Ia)

and units represented by the formula

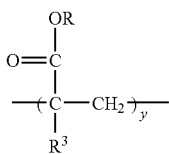

(II)

R may comprise a hydrocarbyl (e.g., alkyl) group of 1 to about 22 carbon atoms, and in one embodiment from about 12 to about 18 carbon atoms, and in one embodiment from about 16 to about 18 carbon atoms. In one embodiment, R may comprise 2-ethylhexyl. In one embodiment, R may comprise an alkyl group of about 12 to about 15 carbon atoms. In one embodiment, R may comprise a $C_{12}$-$C_{18}$ alkyl group, a 2-ethylhexyl group, a butyl group, a methyl group, or a mixture of two or more thereof. In one embodiment, R may comprise a mixture of 2-ethylhexyl and $C_{12}$-$C_{15}$ alkyl.

In formula (Ia) the Xs represent atoms, one of which will be sulfur and the other of which will be oxygen. It is believed that, under usual conditions of synthesis of the monomer corresponding to (Ia), the material will comprise, or will be largely or predominantly, a material corresponding to the structure

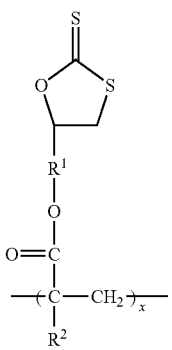

(I)

and the use of this structure within this document is not generally intended to exclude the presence of materials of the more general structure (Ia). It is also intended that the materials represented by the more specific structures below may also contain materials in which the O and S atoms are similarly reversed.

$R^1$ may comprise an alkylene group of 1 to about 20 carbon atoms, and in one embodiment from 1 to about 8 carbon atoms, and in one embodiment from 1 to about 4 carbon atoms, and in one embodiment from 1 to about 2 carbon atoms. In one embodiment, $R^1$ may comprise a methylene group.

$R^2$ and $R^3$ may independently comprise hydrogen or alkyl groups of 1 to about 22 carbon atoms, and in one embodiment from 1 to about 15 carbon atoms, and in one embodiment from 1 to about 8 carbon atoms, and in one embodiment from 1 to about 4 carbon atoms. In one embodiment, $R^2$ and $R^3$ may each comprise methyl.

x is the number of units represented by formula (Ia) or (I) in the polymer. y is the number of units represented by formula (II). The units in question may be referred to as "monomeric units" or "repeating units," but the latter terminology or the structures of formula (Ia), (I), or (II) are not intended to require that such units are, or are necessarily, part of a block or uninterrupted chain of such units. That is, the polymer may be a random polymer or a block copolymer or any other architecture or variation thereof (e.g., diblock, triblock, tapered block, star). The ratio of y to x may be in the range from about 0.1 to about 20, and in one embodiment from about 0.3 to about 20, and in one embodiment from about 0.5 to about 20, and in one embodiment from about 0.7 to about 20, and in one embodiment from about 0.9 to about 20, and in one embodiment from about 1 to about 20, and in one embodiment from about 1 to about 5, and in one embodiment from about 2 to about 4, and in one embodiment from about 3 to about 4.5.

The polymer may have a weight average molecular weight (Mw) in the range from about 5,000 to about 1,000,000, and in one embodiment in the range from about 5,000 to about 500,000, and in one embodiment in the range from about 200,000 to about 300,000, and in one embodiment in the range from about 20,000 to about 60,000. The polymer may have a polydispersity (Mw/Mn) in the range from about 1 to about 15, and in one embodiment from about 1 to about 7.

In one embodiment, the polymer may comprise units represented by the formula

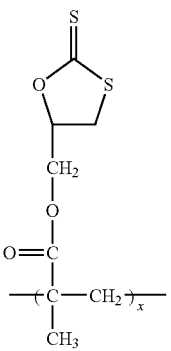

(I-A)

and units represented by the formula

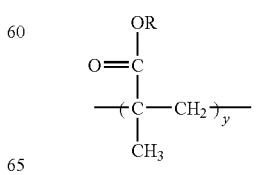

(II-A)

wherein R, x and y are as defined above.

In one embodiment, the polymer may have a number average molecular weight (Mn) in the range from about 15,000 to about 25,000, and in one embodiment in the range from about 19,000 to about 23,000, and in one embodiment in the range from about 21,000 to about 22,000. The polymer may have an Mw in the range from about 200,000 to about 300,000, and in one embodiment in the range from about 240,000 to about 260,000, and in one embodiment about 250,000. The polymer may have a polydispersity in the range from about 7 to about 15, and in one embodiment from about 10 to about 13. The ratio of y to x may be in the range from about 3 to about 4.5, and in one embodiment from about 3.5 to about 4.2, and in one embodiment about 3.8 to about 3.9 or to about 4.0.

In one embodiment, the polymer may have an Mn in the range from about 5000 to about 15,000, and in one embodiment in the range from about 9000 to about 12,000. The Mw may be in the range from about 20,000 to about 60,000, and in one embodiment in the range from about 35,000 to about 45,000. The polydispersity may be in the range from about 1 to about 7, and in one embodiment in the range from about 3 to about 5. The ratio of y to x may be in the range form about 1.5 to about 4, and in one embodiment in the range from about 1.5 to about 2.5.

The inventive polymer may be made by copolymerizing the heterocyclic monomer represented by the following formula (I-1) with the acrylate or methacrylate monomer represented by the following formula (II-1):

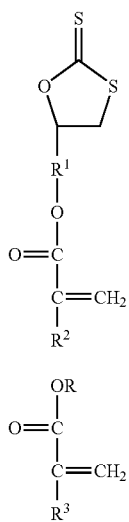

(I-1)

(II-1)

In formulae (I-1) and (II-1) R, $R^1$, $R^2$ and $R^3$ have the meanings indicated above. The mole ratio of the acrylate or methacrylate monomer to the heterocyclic monomer may be in the ranges indicated above for the ratio of y to x. The reaction may be conducted using a catalyst or initiator (e.g., tert-butylperoxy-2-ethylhexanoate or azobis (isobutyronitrile)) without or with a chain transfer agent (e.g., N-dodecyl mercaptan).

In one embodiment, the inventive polymer may be made by copolymerizing the heterocyclic monomer represented by the formula (I-A-I) with the acrylate monomer represented by the formula (II-A-I):

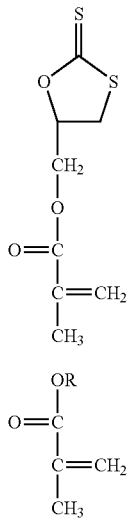

(I-A-1)

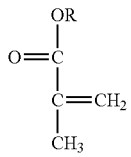

(II-A-1)

The heterocyclic monomers represented by formulae (I-1) and (I-A-1) may be made by reacting an oxirane with $CS_2$ in the presence of a catalyst (e.g., alkali metal halide such as LiBr). The reaction may proceed according to the following equation:

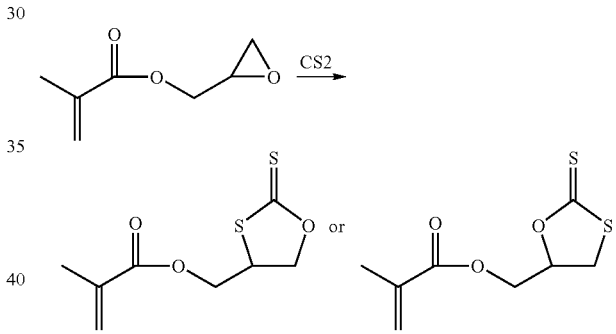

or mixtures thereof. The reactants may be charged to a reactor with stirring and generally without heating, since the reaction is normally exothermic. Once the reaction reaches the temperature of the exotherm (typically up to about 50° C.), the reaction mixture may be held at that temperature to insure complete reaction. After a reaction time of typically about 1 to about 8 hours, the volatile materials may be removed under reduced pressure and the residue may be filtered to yield the final product. The reaction may be conducted in the presence of a solvent, examples of which include tetrahydrofuran, diethylether, and the like. Reactions of this type are disclosed in Kihara et al, "Preparation of 1,3-Oxathiolane-2-thiones by the Reaction of Oxirane and Carbon Disulfide," J. Org. Chem. 1995, 60, 473-475, which is incorporated herein by reference. Preparation of the heterocyclic monomer represented by formula (I-A-1) is shown in the following Example 1.

Example 1

A heterocyclic monomer is prepared by charging a flask with 282 grams of glycidyl methacrylate, 8.7 grams of LiBr, and 200 ml of tetrahydrofuran. 185 grams of $CS_2$ are added through an addition funnel over a period of two hours while maintaining the temperature below 25° C. The reaction mixture is stirred for one hour at room temperature and then allowed to stand overnight. The reaction mixture is subjected to a vacuum to strip out volatiles. Air is bubbled through the reaction mixture to prevent polymerization. During stripping, the temperature is maintained below 20° C. The reaction mixture is extracted with 2 liters of methanol then filtered to remove solids. A filtrate is collected and methanol is removed under reduced pressure at 15° C. leaving 340 grams of monomer which is in the form of a yellow residue.

The following examples show the preparation of the inventive polymers.

Example 2

A flask is charged with 52 grams of the heterocyclic monomer from Example 1, 249 grams of a $C_{12}$-$C_{15}$ alkyl methacrylate, 175 grams of toluene, and 10 grams of azobis (isobutyronitrile). The contents of the flask are heated with stirring to 60° C. under a nitrogen atmosphere. When the temperature reaches 60° C., polymerization is commenced. The reaction temperature is held at 60° C. for one hour. The reaction mixture is then filtered. The product is mixed with 90 g diluent oil. Solvent is removed under reduced pressure at 60-70° C. The product is isolated and is in the form of a thick sticky yellow polymer mixture. This polymer mixture may be referred to as Polymer A. This polymer has an Mn=21394, an Mw=249409, and a polydispersity=11.66.

Example 3

A mixture of 50 grams of the heterocyclic monomer from Example 1, 186 grams of a $C_{12}$-$C_{15}$ alkyl methacrylate and 240 grams of toluene is heated to 40° C. The mixture is filtered to remove LiBr and any oligomers that may be present. The mixture is then charged to a flask, and 4.72 grams of tert-butyl peroxy-2-ethylhexanoate and 4.72 grams of N-dodecyl mercaptan are added. The temperature is held at 100° C. for 4 hours. 60 grams of diluent oil are added. The reaction mixture is vacuum stripped at 100° C. for one hour to remove volatiles. The product is isolated as a thick orange oil. This product may be referred to as Polymer B. This polymer has an Mn=10785, an Mw=41522, and a polydispersity=3.85 as measured by GPC.

The concentration of the inventive polymer in the lubricating oil composition may be in the range from about 1 to about 99% by weight, and in one embodiment from about 70 to about 95% by weight.

The lubricating oil composition may comprise of one or more base oils which may be present in a major amount. The base oil may be present in an amount greater than about 60% by weight, and in one embodiment greater than about 70% by weight, and in one embodiment greater than about 80% by weight, and in one embodiment greater than about 85% by weight of the lubricating oil composition. The lubricating oil composition may comprise one or more of the foregoing polymers. The lubricating oil composition may further comprise one or more zinc dialkyldithiophosphates, one or more alkali or alkaline earth metal containing detergents, one or more acylated-nitrogen containing compounds which may function as dispersants, and/or one or more boron-containing compounds. The lubricating oil composition may contain one or more other additives known in the art.

The lubricating oil composition may have a viscosity of up to about 16.3 $mm^2$/sec at 100° C., and in one embodiment in the range from about 5 to about 16.3 $mm^2$/sec at 100° C., and in one embodiment in the range from about 6 to about 13 $mm^2$/sec at 100° C.

The lubricating oil composition may have an SAE Viscosity Grade of 0W, 0W-20, 0W-30, 0W-40, 0W-50, 0W-60, 5W, 5W-20, 5W-30, 5W-40, 5W-50, 5W-60, 10W, 10W-20, 10W-30, 10W-40, 10W-50, 15W-40, 15W-50, 20W or 30W.

The lubricating oil composition may be characterized by a sulfur content of up to about 1% by weight, and in one embodiment up to about 0.5% by weight, and in one embodiment in the range from about 0.01% to about 1% by weight, and in one embodiment in the range from about 0.01% to about 0.5% by weight.

The lubricating oil composition may be characterized by a phosphorus content of up to about 0.12%, and in one embodiment up to about 0.10%, and in one embodiment up to about 0.08%, and in one embodiment up to about 0.05% by weight, and in one embodiment in the range from about 0.01 to about 0.12%, and in one embodiment in the range from about 0.01 to about 0.10%, and in one embodiment in the range from about 0.01 to about 0.08%, and in one embodiment in the range from about 0.01 to about 0.06%, and in one embodiment in the range form about 0.02 to about 0.12%, and in one embodiment in the range from about 0.02 to about 0.10%, and in one embodiment in the range from about 0.02 to about 0.08%, and in one embodiment in the range from about 0.02 to about 0.06%, and in one embodiment in the range from about 0.03 to about 0.12% by weight, and in one embodiment in the range from about 0.03 to about 0.10% by weight, and in one embodiment in the range from about 0.03 to about 0.08% by weight, and in one embodiment in the range from about 0.03 to about 0.06% by weight, and in one embodiment in the range from about 0.03% to about 0.05% by weight.

The lubricating oil composition may have a boron content in the range up to about 0.2% by weight, and in one embodiment in the range from about 0.01 to about 0.2% by weight, and in one embodiment in the range from about 0.02 to about 0.12% by weight, and in one embodiment in the range from about 0.05 to about 0.1% by weight.

The ash content of the lubricating oil composition as determined by the procedures in ASTM D-874-96 may be in the range from about 0.3 to about 1.4% by weight, and in one embodiment in the range from about 0.3 to about 1.2% by weight, and in one embodiment in the range from about 0.3 to about 1.0% by weight, or alternatively about 0.2 to about 0.6 or about 0.1 to about 0.5% by weight.

The lubricating oil composition may be characterized by a chlorine content of up to about 100 ppm, and in one embodiment up to about 50 ppm, and in one embodiment up to about 10 ppm.

The base oil used in the lubricating oil composition may comprise any of the base oils in Groups I-V as specified in the American Petroleum Institute (API) Base Oil Interchangeability Guidelines. The five base oil groups are as follows:

| Base Oil Category | Sulfur (%) | | Saturates(%) | Viscosity Index |
|---|---|---|---|---|
| Group I | >0.03 | and/or | <90 | 80 to 120 |
| Group II | ≦0.03 | and | ≧90 | 80 to 120 |
| Group III | ≦0.03 | and | ≧90 | ≧120 |
| Group IV | All polyalphaolefins (PAOs) | | | |
| Group V | All others not included in Groups I, II, III or IV | | | |

Groups I, II and III are mineral oil base stocks.

The base oil may be a natural oil, synthetic oil or mixture thereof. The natural oils include animal oils and vegetable oils (e.g., castor oil, lard oil) as well as mineral lubricating oils such as liquid petroleum oils and solvent treated or acid-treated mineral lubricating oils of the paraffinic, naphthenic or mixed paraffinic-naphthenic types. Oils derived from coal or shale are also useful.

Synthetic oils may include hydrocarbon oils such as polymerized and interpolymerized olefins, alkylbenzenes, polyphenyls, alkylated diphenyl ethers, alkylated diphenyl sulfides, and derivatives, analogs and homologs thereof. The synthetic oils include alkylene oxide polymers and interpolymers and derivatives thereof where the terminal hydroxyl groups have been modified by esterification, etherification, etc.; esters of dicarboxylic acids (e.g., phthalic acid, succinic acid, alkyl succinic acids, alkenyl succinic acids, etc.) with a variety of alcohols (e.g., butyl alcohol, hexyl alcohol, dodecyl alcohol, 2-ethylhexyl alcohol, ethylene glycol, etc.); and esters made from $C_5$ to $C_{12}$ monocarboxylic acids and polyols or polyol ethers.

In one embodiment, the base oil may comprise a polyalphaolefin (PAO), an oil derived from Fischer-Tropsch synthesized hydrocarbons, or an hydroisomerized Fischer-Tropsch hydrocarbon oil or wax. In one embodiment, Group II or Group III oils, or mixtures thereof may be used. In one embodiment, mixtures of Group III and Group IV oils may be used.

Unrefined, refined and rerefined oils, either natural or synthetic (as well as mixtures of two or more of any of these) of the type disclosed hereinabove may be used as the base oil.

The zinc dialkyldithiophosphate may be derived from one or more dithiophosphoric acids represented by the formula

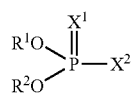

(III)

and/or metal salt thereof, wherein in Formula (III): $R^1$ and $R^2$ are independently hydrocarbyl groups. The average total number of carbon atoms in $R^1$ and $R^2$ in Formula I may be up to about 100 or up to about 50, and in one embodiment in the range from about 4 to about 100, and in one embodiment in the range from about 4 to about 60, and in one embodiment in the range from about 4 to about 50. In other embodiments the total number of carbon atoms in $R^1$ and $R^2$ may be in the range of about 6 to about 40 or about 6 to about 20 or about 6 to about 16. $R^1$ and $R^2$ may be independently alkyl groups, alkenyl groups, aromatic groups, or mixtures of two or more thereof. $R^1$ and $R^2$ may be derived from one or more primary alcohols, one or more secondary alcohols, or a mixture of at least one primary alcohol and at least one secondary alcohol. $R^1$ and $R^2$ may be the same as each other, although they may be different and either or both may be mixtures. Examples of $R^1$ and $R^2$ may include isopropyl, 1,3-dimethylbutyl, isooctyl, decyl, dodecyl, tetradecyl, dodecenyl, phenyl, naphthyl, alkylphenyl, alkylnaphthyl, phenylalkyl, naphthylalkyl, alkylphenylalkyl, alkylnaphthylalkyl, and mixtures thereof. The phosphorus-containing compound may be a dialkyldithiophosphate derived from 4-methyl-2-pentanol.

In one embodiment, two or more phosphorus-containing compounds may be used in the lubricating oil composition and at least about 80% by weight, and in one embodiment at least about 90% by weight, and in one embodiment at least about 95% by weight, and in one embodiment at least about 98% by weight, of the phosphorus present in the lubricating oil composition at the time the lubricating oil composition is added to the engine may be present in a compound represented by formula (III).

In one embodiment, the following mixture of phosphorus-containing compounds may be used: about 70 to about 99 molar percent of a dialkyldithiophosphate derived from 4-methyl-2-pentanol; and about 1 to about 30 molar percent of a dialkyldithiophosphate derived from an alcohol mixture of about 60% by weight isopropyl alcohol and about 40% by weight 4-methyl-2-pentanol.

The zinc dialkyl dithiophosphate may be neutral or overbased. The metal ratio of the overbased zinc dialkyldithiophosphate may be at least about 1.15:1, and in one embodiment in the range from about 1.15:1 to about 1.5:1, and in one embodiment in the range from about 1.2:1 to about 1.4:1. A metal ratio in the range from 1:1 to 1.07:1, or a Zn/P weight ratio of up to about 1.12 may be referred to as being neutral or substantially neutral.

The zinc dialkyldithiophosphate may be employed in the lubricating oil composition at a concentration sufficient to provide the lubricating oil composition with a phosphorus concentration in the range up to about 0.12% by weight, and in one embodiment in the range from about 0.03 to about 0.12% percent by weight, and in one embodiment in the range from about 0.03% to about 0.10% by weight, and in one embodiment in the range from about 0.03 to about 0.08% by weight, and in one embodiment in the range from about 0.03 to about 0.05% by weight.

The acylated nitrogen containing compound may contain a substituent comprising at least about 30 aliphatic carbon atoms and may be made by reacting at least one carboxylic acid acylating agent with at least one amino compound. The acylating agent may be linked to the amino compound through an imido, amido, amidine or salt linkage. The substituent comprising at least about 30 aliphatic carbon atoms may be in either the carboxylic acid acylating agent derived portion of the molecule or in the amino compound derived portion of the molecule.

These substituents may be hydrocarbyl groups made from homo- or interpolymers (e.g., copolymers, terpolymers) of mono- or di-olefins having 2 to about 10 carbon atoms, such as ethylene, propylene, 1-butene, isobutene, butadiene, isoprene, 1-hexene, 1-octene, etc. Typically, these olefins are 1-monoolefins. The substituent may also be derived from the halogenated (e.g., chlorinated or brominated) analogs of such homo- or interpolymers.

A useful source for the substituent groups may comprise poly(isobutene)s obtained by the polymerization of a $C_4$ refinery stream having a butene content of about 35 to about 75 weight percent and an isobutene content of about 30 to about 60 weight percent in the presence of a Lewis acid catalyst such as aluminum trichloride or boron trifluoride. These polybutenes may contain predominantly isobutene repeating units.

The substituent may comprise a polyisobutene group derived from a polyisobutene having a high methylvinylidene isomer content, that is, at least about 50% methylvinylidene, and in one embodiment at least about 70% methylvinylidene. These high methylvinylidene polyisobutenes may include those prepared using boron trifluoride catalysts.

The number average molecular weight of the acylating agent may vary from about 300 up to about 5,000, 10,000 or 20,000. In one embodiment, the acylating agent may be a hydrocarbyl substituted succinic acid or anhydride containing hydrocarbyl substituent groups and succinic groups wherein the substituent groups are derived from a polyalkene such as polyisobutene. The acid or anhydride may be characterized by the presence within its structure of an average of at least about 1 succinic group for each equivalent weight of substituent groups, and in one embodiment from about 1 to about 2.5 succinic groups for each equivalent weight of substituent groups. The polyalkene may have number average molecular weight ($\overline{M}_n$) of at least about 700, and in one embodiment about 700 to about 3000, and in one embodiment about 900 to about 2200. The ratio between the weight average molecular weight ($\overline{M}w$) and the ($\overline{M}n$) (that is, $\overline{M}w/\overline{M}n$) may range from about 1 to about 10, and in one embodiment about 1.5 to about 5, and in one embodiment about 2.5 to about 5. The number of equivalent weights of substituent groups may be deemed to be the number corresponding to the quotient obtained by dividing the $\overline{M}n$ value of the polyalkene from which the substituent is derived into the total weight of the substituent groups present in the substituted succinic acid or anhydride.

The amino compound may be characterized by the presence within its structure of at least one HN< group and may be a monoamine or polyamine. Mixtures of two or more amino compounds may be used in the reaction with one or more acylating reagents. In one embodiment, the amino compound may contain at least one primary amino group (i.e., —NH$_2$). In one embodiment, the amine may be a polyamine, for example, a polyamine containing at least two —NH— groups, either or both of which are primary or secondary amines. The amines may be aliphatic, cycloaliphatic, aromatic or heterocyclic amines. Hydroxy substituted amines, such as alkanol amines (e.g., mono- or diethanol amine), and hydroxy (polyhydrocarbyloxy) anologs of such alkanol amines may be used.

Among the useful amines are the alkylene polyamines, including the polyalkylene polyamines. The alkylene polyamines may include those represented by the formula

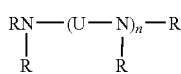 (IV)

wherein in Formula (IV), n is from 1 to about 14; each R is independently a hydrogen atom, a hydrocarbyl group or a hydroxy-substituted or amine-substituted hydrocarbyl group having up to about 30 atoms, or two R groups on different nitrogen atoms can be joined together to form a U group, with the proviso that at least one R group is a hydrogen atom and U is an alkylene group of about 2 to about 10 carbon atoms. U may be ethylene or propylene. Alkylene polyamines where each R is hydrogen or an amino-substituted hydrocarbyl group with the ethylene polyamines and mixtures of ethylene polyamines are useful. Usually n will have an average value of from about 2 to about 10. Such alkylene polyamines include methylene polyamines, ethylene polyamines, propylene polyamines, butylene polyamines, pentylene polyamines, hexylene polyamines, heptylene polyamines, amino propylated ethylene polyamines, etc. The higher homologs of such amines and related amino alkyl-substituted piperazines may be included.

Alkylene polyamines that may be useful may include ethylene diamine, diethylene triamine, triethylene tetramine, tetraethylene pentamine, pentaethylene hexamine, propylene diamine, trimethylene diamine, hexamethylene diamine, decamethylene diamine, octamethylene diamine, di(heptamethylene) triamine, tripropylene tetramine, trimethylene diamine, di(trimethylene)triamine, N-(2-aminoethyl)piperazine, 1,4-bis(2-aminoethyl)piperazine, and the like. Higher homologs such as those obtained by condensing two or more of the above-illustrated alkylene amines may be used. Mixtures of two or more of any of the afore-described polyamines may be used.

Useful polyamines may include those resulting from stripping polyamine mixtures. In this instance, lower molecular weight polyamines and volatile contaminants are removed from an alkylene polyamine mixture to leave as residue what is often termed "polyamine bottoms". In general, alkylene polyamine bottoms can be characterized as having less than about 2% by weight, and in one embodiment less than about 1% by weight material boiling below about 200° C.

The acylated nitrogen containing compounds may include amine salts, amides, imides, amidines, amidic acids, amidic salts and imidazolines as well as mixtures thereof. To prepare the acylated nitrogen-containing compounds from the acylating agents and the amino compounds, one or more acylating reagents and one or more amino compounds may be heated, optionally in the presence of a normally liquid, substantially inert organic liquid solvent/diluent, at temperatures in the range of 80° C. up to the decomposition point of any of the reactants or the product but normally at temperatures in the range of about 100° C. to about 300° C., provided 300° C. does not exceed the decomposition point of any of the reactants or the product. Temperatures of about 125° C. to about 250° C. may be used. The acylating agent and the amino compound may be reacted in amounts sufficient to provide from about 0.5 to about 3 moles of amino compound per equivalent of acylating agent. The number of equivalents of the acylating agent may vary with the number of carboxy groups present therein. In determining the number of equivalents of the acylating agent, those carboxyl functions which are not capable of reacting as a carboxylic acid acylating agent are excluded. In general, however, there is one equivalent of acylating agent for each carboxy group in the acylating agent.

The use of acylated nitrogen containing compounds with relatively high TBNs in the lubricating oil composition may tend to reduce the volatility of the phosphorus in the overbased low molecular weight zinc dialkyldithiophosphate. Accordingly, in one embodiment, the acylated nitrogen containing compound may have a TBN (on an oil-free basis) of at least about 2, and in one embodiment in the range from about 2 to about 60, and in one embodiment in the range from about 5 to about 30, and in one embodiment in the range from about 10 to about 20.

The acylated nitrogen containing compound may be employed in the lubricating oil composition at a concentration in the range from about 1% to about 20% by weight, and in one embodiment in the range from about 1% to about 10% percent by weight, and in one embodiment in the range from about 1% to about 5% by weight.

The alkali metal or alkaline earth metal containing detergent may be an alkali or alkaline earth metal salt of an acidic organic compound. The acidic organic compound may be an organic sulfur acid, phenol, carboxylic acid, salixarate, or a mixture of two or more thereof. The detergent may comprise at least one salt of at least one substrate comprising salicylic acid and/or a salicylate moiety. These salts may be neutral or overbased. The former contain an amount of metal cation just sufficient to neutralize the acidic groups present in the salt anion; the latter contain an excess of metal cation and are often termed basic, overbased, hyperbased or superbased salts. These salts may have a TBN in the range from about 30 to about 460, and in one embodiment in the range from about 100 to about 400, and in one embodiment in the range from about 200 to about 400, and in one embodiment in the range from about 300 to about 400.

The organic sulfur acids may be oil-soluble organic sulfur acids such as sulfonic, sulfamic, thiosulfonic, sulfinic, sulfenic, partial ester sulfuric, sulfurous and thiosulfuric acid. Generally they are salts of aliphatic or aromatic sulfonic acids. The sulfonic acids include the mono- or poly-nuclear aromatic or cycloaliphatic compounds.

The carboxylic acids may include aliphatic, cycloaliphatic, and aromatic mono- and polybasic carboxylic acids such as the naphthenic acids, alkyl- or alkenyl-substituted cyclopentanoic acids, alkyl- or alkenyl-substituted cyclohexanoic acids, alkyl- or alkenyl-substituted aromatic carboxylic acids. The aliphatic acids may contain at least about 8 carbon atoms, and in one embodiment at least about 12 carbon atoms. Usually they have no more than about 400 carbon atoms. The cycloaliphatic and aliphatic carboxylic acids may be saturated or unsaturated.

A useful group of carboxylic acids may be the oil-soluble aromatic carboxylic acids. These acids may be represented by the formula:

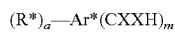 (V)

wherein in Formula (V), $R^*$ is an aliphatic hydrocarbyl group of about 4 to about 400 carbon atoms, a is an integer of from one to four, $Ar^*$ is a polyvalent aromatic hydrocarbon nucleus of up to about 14 carbon atoms, each X is independently a sulfur or oxygen atom, and m is an integer of from one to four with the proviso that $R^*$ and a are such that there is an average of at least about 8 aliphatic carbon atoms provided by the $R^*$ groups for each acid molecule.

A useful group of carboxylic acids may be the aliphatic-hydrocarbon substituted salicylic acids wherein each aliphatic hydrocarbon substituent contains an average of at least about 8 carbon atoms, and in one embodiment at least about 16 carbon atoms per substituent, and the acids contain one to three substituents per molecule. A useful aliphatic-hydrocarbon substituted salicylic acid is $C_{16}$-$C_{18}$ alkyl salicylic acid. A group of carboxylic acid derivatives that are useful are the lactones represented by the formula

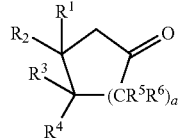 (VI)

wherein in Formula (VI), $R^1$, $R^2$, $R^3$, $R^4$, $R^5$ and $R^6$ are independently H, hydrocarbyl groups or hydroxy substituted hydrocarbyl groups of from 1 to about 30 carbon atoms, with the proviso that the total number of carbon atoms must be sufficient to render the lactones oil soluble; $R^2$ and $R^3$ can be linked together to form an aliphatic or aromatic ring; and a is a number in the range of zero to 4. A useful lactone can be prepared by reacting an alkyl (e.g., dodecyl)phenol with glyoxylic acid at a molar ratio of about 2:1.

Neutral and basic salts of phenols (generally known as phenates) are also useful in the compositions of this invention and well known to those skilled in the art. The phenols from which these phenates are formed are of the general formula

 (VII)

wherein in Formula (VII), $R^*$, a, $Ar^*$, and m have the same meaning as described hereinabove with reference to Formula (V).

The salixarate may be a substantially linear compound comprising at least one unit of formula (VIII) or formula (IX):

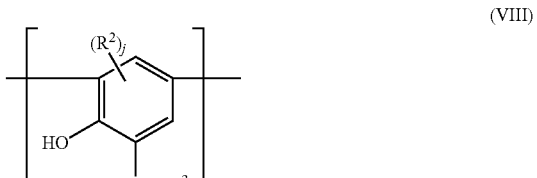 (VIII)

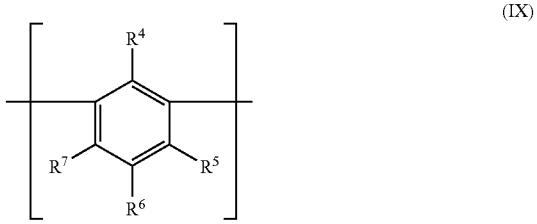 (IX)

each end of the compound having a terminal group of formula (X) or formula (XI):

 (X)

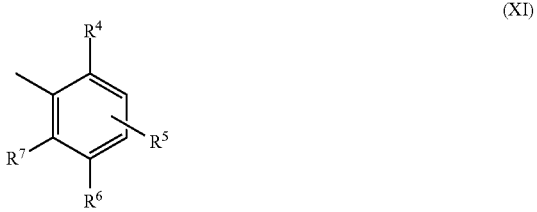 (XI)

such groups being linked by divalent bridging groups A, which may be the same or different for each linkage; wherein in formulas (VIII)-(XI), $R^3$ is hydrogen or a hydrocarbyl group; $R^2$ is hydroxyl or a hydrocarbyl group and j is 0, 1, or 2; $R^6$ is hydrogen, a hydrocarbyl group, or a hetero-substituted hydrocarbyl group; either $R^4$ is hydroxyl and $R^5$ and $R^7$ are independently either hydrogen, a hydrocarbyl group, or hetero-substituted hydrocarbyl group, or else $R^5$ and $R^7$ are both hydroxyl and $R^4$ is hydrogen, a hydrocarbyl group, or a hetero-substituted hydrocarbyl group; provided that at least one of $R^4$, $R^5$, $R^6$ and $R^7$ is hydrocarbyl containing at least 8 carbon atoms; and wherein the molecules on average contain at least one of unit (VIII) or (X) and at least one of unit (IX) or (XI) and the ratio of the total number of units (VIII) and (X) to the total number of units of (IX) and (XI) in the composition is about 0.1:1 to about 2:1.

The divalent bridging group "A," which may be the same or different in each occurrence, includes —$CH_2$— (methylene bridge) and —$CH_2OCH_2$— (ether bridge), either of which may be derived from formaldehyde or a formaldehyde equivalent (e.g., paraform, formalin).

Salixarate derivatives and methods of their preparation are described in greater detail in U.S. Pat. No. 6,200,936 and PCT Publication WO 01/56968. It is believed that the salixarate derivatives have a predominantly linear, rather than macrocyclic, structure, although both structures are intended to be encompassed by the term "salixarate."

Mixtures of two or more neutral or basic metal salts of the hereinabove described acidic organic compounds may be used in the lubricating oil compositions.

The alkali and alkaline earth metals that may be useful may include sodium, potassium, lithium, calcium, magnesium, strontium and barium. Sodium, lithium and calcium may be especially useful.

The use of sodium in the lubricating oil composition may tend to decrease the volatility of the phosphorus used therein significantly. Accordingly, in one embodiment of the invention, the use of sodium as the detergent metal may be particularly useful.

The alkali or alkaline earth metal containing detergent may be employed in the lubricating oil composition at a concentration in the range from about 0.1 to about 10% by weight, and in one embodiment in the range from about 0.2 to about 5% percent by weight, and in one embodiment in the range from about 0.3% to about 3% by weight, and in one embodiment in the range from about 0.5 to about 2% by weight.

The boron-containing compound may be a compound represented by one or more of the formulae $$RO-B\underset{OR}{\overset{OR}{\diagdown}} \quad \text{(XIII)}$$

or $$\underset{RO}{\overset{RO}{\diagdown}}B-O-B\underset{OR}{\overset{OR}{\diagdown}} \quad \text{(XIV)}$$

or

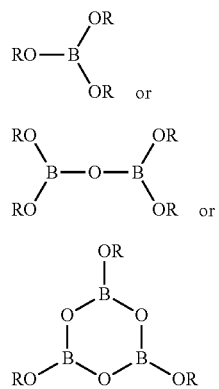
(XV)

wherein in Formulae XIII-XV, each R may be independently an organic group and any two adjacent R groups may together form a cyclic group. Mixtures of two or more of the foregoing may be used. In one embodiment, each R may be independently a hydrocarbyl group. The total number of carbon atoms in the R groups in each formula may be sufficient to render the compound soluble in the base oil. Generally, the total number of carbon atoms in the R groups may be at least about 8, and in one embodiment at least about 10, and in one embodiment at least about 12. There may be no limit to the total number of carbon atoms in the R groups that is required, but a practical upper limit may be about 400 or about 500 carbon atoms. In one embodiment, each R group may be independently a hydrocarbyl group of 1 to about 100 carbon atoms, and in one embodiment 1 to about 50 carbon atoms, and in one embodiment 1 to about 30 carbon atoms, and in one embodiment 1 to about 10 carbon atoms, with the proviso that the total number of carbons in the R group may be at least about 8. Each R group may be the same as the other, although they may be different. Examples of useful R groups may include isopropyl, n-butyl, isobutyl, amyl, 1,3 dimethyl-butyl, 2-ethyl-1-hexyl, isooctyl, decyl, dodecyl, tetradecyl, 2-pentenyl, dodecenyl, phenyl, naphthyl, alkylphenyl, alkylnaphthyl, phenylalkyl, naphthylalkyl, alkylphenylalkyl, alkylnaphthylalkyl, and the like.

In one embodiment, the boron-containing compound may be a compound represented by the formula

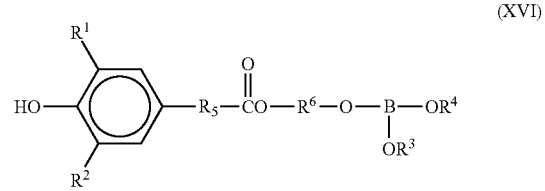
(XVI)

wherein in Formula (XVI): $R^1$, $R^2$, $R^3$ and $R^4$ are independently hydrocarbyl groups of 1 to about 12 carbon atoms; and $R^5$ and $R^6$ are independently alkylene groups of 1 to about 6 carbon atoms, and in one embodiment about 2 to about 4 carbon atoms, and in one embodiment about 2 or about 3 carbon atoms. In one embodiment, $R^1$ and $R^2$ may independently contain 1 to about 6 carbon atoms, and in one embodiment each may be a t-butyl group. In one embodiment, $R^3$ and $R^4$ are independently hydrocarbyl groups of about 2 to about 12 carbon atoms, and in one embodiment about 8 to about 10 carbon atoms. In one embodiment, $R^5$ and $R^6$ are independently —$CH_2CH_2$— or —$CH_2CH_2CH_2$—.

In one embodiment, the boron-containing compound may be a compound represented by the formula:

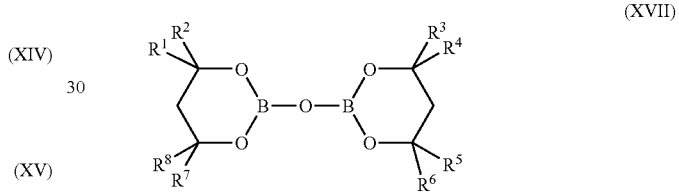
(XVII)

wherein in Formula (XVII): $R^1$, $R^2$, $R^3$, $R^4$, $R^5$, $R^6$, $R^7$ and $R^8$ are independently hydrogen or hydrocarbyl groups. Each of the hydrocarbyl groups may contain from 1 to about 12 carbon atoms, and in one embodiment 1 to about 4 carbon atoms. An example is 2,2'-oxy-bis-(4,4,6-trimethyl-1,3,2-dioxaborinane).

A useful boron-containing compound may be available from Crompton Corporation under the trade designation LA-2607. This material may be identified as a phenolic borate having the structure represented by Formula (XVI) wherein $R^1$ and $R^2$ are each t-butyl, $R^3$ and $R^4$ are hydrocarbyl groups of 2 to about 12 carbon atoms, $R^5$ is —$CH_2CH_2$—, and $R^6$ is —$CH_2CH_2CH_2$—.

In one embodiment, the boron-containing compound may be a compound represented by the formula $B(OC_5H_{11})_3$ or $B(OC_4H_9)_3$. A useful boron-containing compound may be available from Mobil under the trade designation MCP-1286; this material may be identified as a borated ester.

The boron-containing compound may be employed in the lubricating oil composition at a sufficient concentration to provide the lubricating oil composition with a boron concentration in the range up to about 0.2% by weight, and in one embodiment in the range from about 0.01% to about 0.2% by weight, and in one embodiment in the range from about 0.02% to about 0.12% by weight, and in one embodiment in the range from about 0.05% to about 0.1% by weight. These compounds may be added directly to the lubricating oil composition. In one embodiment, however, they may be diluted with a substantially inert, normally liquid organic diluent such as mineral oil, synthetic oil (e.g., ester of dicarboxylic acid), naptha, alkylated (e.g. $C_{10}$-$C_{13}$ alkyl)benzene, toluene or xylene to form an additive concentrate. These concentrates may contain from about 1% to about 99% by weight and in one embodiment about 10% to about 90% by weight of the diluent.

The lubricating oil composition may also contain other lubricant additives. These may include, for example, corrosion-inhibiting agents, antioxidants, viscosity modifiers, dispersant viscosity index modifiers, pour point depressants, friction modifiers, antiwear agents other than those discussed above, EP agents other than those discussed above, dispersants other than those discussed above, detergents other than those discussed above, fluidity modifiers, copper passivators, anti-foam agents, etc. Each of the foregoing additives, when used, may be used at a functionally effective amount to impart the desired properties to the lubricant. Generally, the concentration of each of these additives, when used, may be in the range from about 0.001% to about 20% by weight, and in one embodiment in the range from about 0.01% to about 10% by weight based on the total weight of the lubricating oil composition.

The foregoing lubricating oil additives may be added directly to the base oil to form the lubricating oil composition. In one embodiment, however, one or more of the additives may be diluted with a substantially inert, normally liquid organic diluent such as mineral oil, synthetic oil, naphtha, alkylated (e.g., $C_{10}$-$C_{13}$ alkyl)benzene, toluene or xylene to form an additive concentrate. These concentrates may contain from about 1% to about 99% by weight, and in one embodiment from about 10% to 90% by weight of such diluent. The concentrates may be added to the base oil to form the lubricating oil composition.

Example 4

The lubricating oil compositions shown in Table 1 and Table 2 below are prepared using Polymers A or B and are prepared in mineral oil. Formulations 1-3 employing Polymers A or B are within the scope of the invention. Formulations C-1, C-2 and C-3, which do not contain either polymer, are provided for purposes of comparison. The lubricating oil compositions are tested for wear scar diameter and coefficient of friction using a High Frequency Reciprocating Rig (HFFR), Cameron Plint™ rig, and #1324 SRV.

The High Frequency Reciprocating Rig (HFRR) test method provides friction and wear test results. The method uses a ball-on-disk test configuration to quantitatively measure wear, average friction coefficient and percent oil filming tendencies of fully formulated lubricating oil compositions.

The Cameron Plint test procedure uses a Cameron Plint™ reciprocating rig to evaluate fully formulated lubricating oil compositions for coefficient of friction, wear scar and film thickness.

The #1324 SRV is a test procedure for measuring friction/fuel economy using a cylinder on flat geometry. The temperature is ramped from 40° C. to 120° C. over a 45 minute period. The average friction coefficient for the last 15 minutes is reported.

Pressure Differential Scanning Calorimetry (PDSC) is a test designed to measure the oxidative stability of a fluid by measuring the time interval before oxidation onset occurs. Higher numbers are indicative of better oxidative stability.

TABLE 1

| | Formulation | | |
|---|---|---|---|
| | 1 | 2 | C-1 |
| Polymethacrylate viscosity modifier (35% by weight oil) | 0.15 | 0.15 | 0.15 |
| Olefin copolymer viscosity modifier (91% by weight oil) | 8 | 8 | 8 |
| Diluent oil | 0.89 | 0.89 | 0.89 |
| Succinimide dispersant derived from polyalkeneamines (47% by weight oil) | 5.1 | 5.1 | 5.1 |
| Zinc dialkyl dithiophosphate (9% by weight oil) | 0.48 | 0.48 | 0.48 |
| Overbased calcium sulfonate detergent, TBN = 300 (42% by weight oil) | 0.88 | 0.88 | 0.88 |
| Overbased calcium sulfonate detergent, TBN = 400, (42% by weight oil) | 0.65 | 0.65 | 0.65 |
| Glycerol monooleate | 0.1 | 0.1 | 0.1 |
| Sulfurized olefin antioxidant (5% by weight oil) | 0.44 | 0.44 | 0.44 |
| Hindered phenolic ester antioxidant | 2 | 2 | 2 |
| Aromatic amine antioxidant | 1 | 1 | 1 |
| Polymer A (Example 2) | 3 | — | — |
| Polymer B (Example 3) | — | 1 | — |
| Silicone antifoam agent (ppm) | 90 | 90 | 90 |
| Elementals | | | |
| % Sulfur | 0.3 | 0.27 | 0.20 |
| % Phosphorus | 0.05 | 0.05 | 0.05 |
| % Zinc | 0.05 | 0.05 | 0.05 |
| HFFR | | | |
| Wear scar diameter | 330 | 293 | 372 |
| Film thickness | 2 | 42 | 5 |
| Friction coefficient | 0.198 | 0.179 | 0.206 |
| #1324 SRV Friction Coefficient | 0.145 | 0.134 | — |
| Cameron Plint | | | |
| Wear scar diameter | 315 | 459 | 661 |
| Film thickness | 83.9 | 72.1 | 62 |
| Friction coefficient | 0.105 | 0.1132 | 0.12 |

TABLE 2

| | Formulation | | |
|---|---|---|---|
| | 3 | C-2 | C-3 |
| Polymethacrylate viscosity modifier (35% by weight oil) | 0.15 | 0.15 | 0.15 |
| Olefin copolymer viscosity modifier (91% by weight oil) | 4.5 | 5 | 5 |
| Diluent oil | 0.41 | 0.41 | 0.41 |
| Succinimide dispersant derived from polyalkeneamines (47% wt oil) | 5.1 | 5.1 | 5.1 |
| Zinc dialkyl dithiophosphate (9% wt oil) | 0.3 | 0.3 | 0.6 |
| Overbased calcium sulfonate detergent, TBN = 300 (42% wt oil) | 0.88 | 0.88 | 0.88 |
| Overbased calcium sulfonate detergent, TBN = 400, (42% wt oil) | 0.65 | 0.65 | 0.65 |
| Fatty acid amide | 0.1 | 0.1 | 0.1 |
| Sulfurized olefin antioxidant (5% wt oil) | 0.4 | 0.4 | 0.4 |
| Hindered phenolic ester antioxidant | 0.9 | 0.9 | 0.9 |
| Aromatic amine antioxidant | 0.9 | 0.9 | 0.9 |
| Polymer B (Example 3) | 1.5 | — | — |
| Silicone antifoam agent (ppm) | 90 | 90 | 100 |
| Elementals | | | |
| % Sulfur | 0.2 | 0.16 | 0.22 |
| % Phosphorus | 0.03 | 0.03 | 0.06 |

TABLE 2-continued

|  | Formulation | | |
|---|---|---|---|
|  | 3 | C-2 | C-3 |
| % Zinc | 0.03 | 0.03 | 0.07 |
| Cameron Plint |  |  |  |
| Wear scar diameter | 364 | 924 | 394 |
| Film thickness | 71 | 27 | 81 |
| Friction coefficient | 0.16 | 0.16 | 0.12 |
| PDSC (Oxidation Onset, min) | 60 | 42 | 51 |

While the invention has been explained in relation to various embodiments, it is to be understood that various modifications thereof may become apparent to those skilled in the art upon reading the specification. Therefore, it is to be understood that the invention includes all such modifications that may fall within the scope of the appended claims.

The invention claimed is:

1. A polymer comprising units represented by the formula

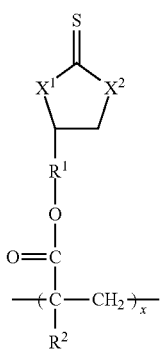

(Ia)

and units represented by the formula

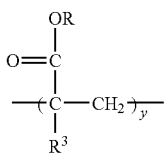

(II)

wherein: R, $R^1$, $R^2$ and $R^3$ are independently hydrocarbyl groups and $R^2$ and $R^3$ may independently also be hydrogen; one of $X^1$ and $X^2$ is S and the other of $X^1$ and $X^2$ is O; x is the number units represented by formula (I) in the polymer; y is the number of units represented by formula (II) in the polymer; the ratio of y to x being in the range from about 0.1 to about 20, the polymer having a weight average molecular weight in the range from about 5,000 to about 1,000,000, and wherein the polymer is a star polymer.

2. The polymer of claim 1 wherein the units of formula (Ia) comprise units represented by the formula

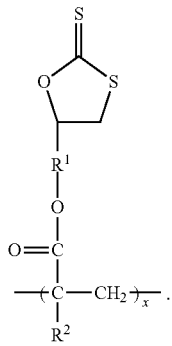

(I)

3. The polymer of claim 1 wherein the polymer is a random copolymer.

4. The polymer of claim 1 wherein the polymer is a block copolymer.

5. The polymer of claim 1 wherein R is a hydrocarbyl group of about 1 to about 22 carbon atoms.

6. The polymer of claim 1 wherein R comprises an alkyl group of about 12 to about 18 carbon atoms, a 2-ethylhexyl group, a butyl group, a methyl group, or a mixture of two or more thereof; $R^1$ is methylene; and $R^2$ and $R^3$ are each methyl.

7. The polymer of claim 1 wherein the weight average molecular weight of the polymer is in the range from about 200,000 to about 300,000, and the ratio of y to x is in the range from about 3 to about 4.5.

8. The polymer of claim 1 wherein the weight average molecular weight of the polymer is in the range from about 20,000 to about 60,000, and the ratio of y to x is in the range from about 1.5 to about 4.

9. A polymer comprising units represented by the formula

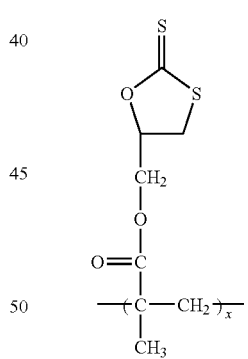

(I-A)

and units represented by the formula

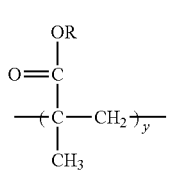

(II-A)

wherein: R is a hydrocarbyl group of about 1 to about 22 carbon atoms; x is the number of units represented by formula (I) in the polymer; y is the number of units represented by formula (II) in the polymer; the ratio of y to x being in the range from about 0.1 to about 20; and the polymer having a weight average molecular weight in the range from about 5,000 to about 1,000,000, and wherein the polymer is a star polymer.

10. A concentrate comprising from about 1% to about 99% by weight of at least one diluent and the polymer of claim 1.

11. A lubricating oil composition comprising a major amount of at least one base oil and the polymer of claim 1.

12. The composition of claim 11 wherein the base oil comprises mineral oil.

13. The composition of claim 11 wherein the base oil comprises a poly-alpha-olefin, an oil derived from Fischer-Tropsch synthesized hydrocarbons, or an hydroisomerized Fischer-Tropsch hydrocarbon oil or wax.

14. The composition of claim 11 wherein the lubricating oil composition further comprises at least one zinc dialkyldithiophosphate.

15. The composition of claim 11 wherein the lubricating oil composition has a phosphorus concentration of about 0.02 to about 0.08% by weight.

16. The composition of claim 11 wherein the lubricating oil composition further comprises at least one alkali or alkaline earth metal containing detergent.

17. The composition of claim 16 wherein the alkali or alkaline earth metal-containing detergent comprises at least one salt of at least one substrate comprising salicylic acid and/or a salicylate moiety.

18. The composition of claim 11 wherein the lubricating oil composition further comprises at least one acylated nitrogen containing compound having at least about 30 aliphatic carbon atoms.

19. The composition of claim 11 wherein the composition further comprises at least one boron-containing compound represented by the formula

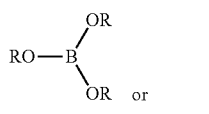

(XIII)

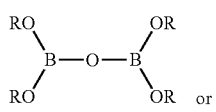

(XIV)

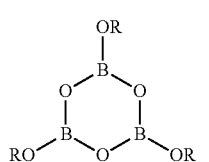

(XV)

wherein in Formulae (XIII), (XIV) and (XV) each R is independently an organic group and any two adjacent R groups may together form a cyclic group.

20. The composition of claim 11 wherein the lubricating oil composition further comprises one or more: dispersants, corrosioninhibiting agents, antioxidants, viscosity modifiers, dispersant viscosity index modifiers, pour point depressants, friction modifiers, anti-wear agents, extreme pressure agents, fluidity modifiers, copper passivators, anti-foam agents, or a mixture of two or more thereof.

* * * * *